June 29, 1926.  
R. TIEDTKE ET AL  
1,590,266  
CONTINUOUS ABSORPTION APPARATUS  
Filed August 18, 1925

Richard Tiedtke  
Jacob Benz  
INVENTORS  
BY Byrnes Townsend Breckenstein  
ATTORNEYS.

Patented June 29, 1926.

1,590,266

UNITED STATES PATENT OFFICE.

RICHARD TIEDTKE, OF HOCHST-ON-THE-MAIN, AND JACOB BENZ, OF NIEDERNHAUSEN A/TAUNUS, GERMANY, ASSIGNORS TO FARBWERKE VORM. MEISTER LUCIUS & BRUNING, OF HOCHST-ON-THE-MAIN, GERMANY, A CORPORATION OF GERMANY.

CONTINUOUS-ABSORPTION APPARATUS.

Application filed August 18, 1925, Serial No. 51,048, and in Germany August 28, 1924.

This invention relates to gas adsorption apparatus of the type in which relative movement takes place between the adsorbent holder and the fluid supply pipes, which relative movement permits the continuous operation of the apparatus.

It is an object of the invention to provide a gas adsorption apparatus which is simple in construction and operation.

It is a more particular object to provide an apparatus of the character referred to, which can be readily made gas-tight.

Figure 1:
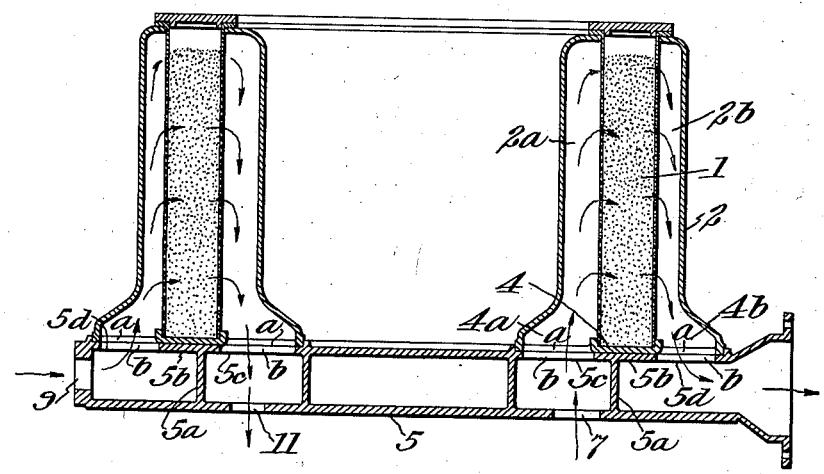
Figure 2:
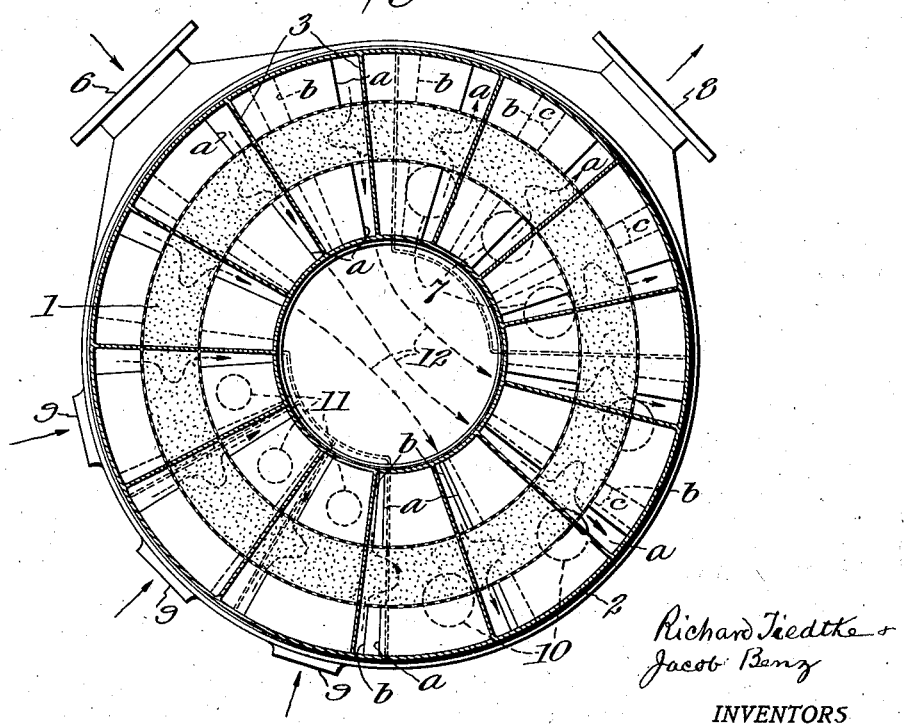

For a full understanding of the invention and the characteristic features thereof, reference is made to the accompanying drawings, in which, Fig. 1 is a more or less diagrammatic elevation of a construction embodying the invention; and Fig. 2 is a diagrammatic horizontal section thereof.

In the drawings, 1 represents an annular body of adsorptive material such as charcoal, surrounded by an annular casing 2 defining gas spaces $2^a$ and $2^b$ on opposite sides of the body 1. Radial partitions 3 divide both the body 1 and the casing into a relatively large number of sector-like parts. The body 1 is carried upon an annular base 4 on the opposite sides of which are disposed annular plates $4^a$ and $4^b$ provided with relatively narrow sector-like openings $a$. The annular plates $4^a$ and $4^b$ form closures and the openings $a$ afford the only communication with the interior of the casing.

The structure thus far described constitutes a single operative unit. It is supported upon an annular casing 5 which is divided into two sections by a concentric partition $5^a$ defining at its upper end a support $5^b$ for the body 1. The space between the inner wall of the casing 5 and the partition $5^a$, on the one hand, and between the partition $5^a$ and the outer wall of the casing is closed by annular plates $5^c$ and $5^d$ provided with relatively large sector-like openings $b$ defining relatively narrow webs $c$.

The body 1 together with casing 2 and annular base plate 4 is mounted upon the casing 5 for rotation, while the latter is stationary. The annular plates $4^a$ and $4^b$ cooperate with the annular plates $5^c$ and $5^d$ to control the flow of gas into and out of the gas spaces $2^a$ and $2^b$. They are in effect slide valves.

The space in the casing 5 may be suitably subdivided to form gas channels for directing the flow of gas in any desired order through the various sections of the body 1.

As indicated, the raw gas stream may be passed through inlet 6 into a section of the casing 5 to charge a number of the sections of body 1. The gas passes up through the openings $b$ and $a$ into the corresponding sections of the gas space $2^a$, then through the corresponding sections of the adsorptive material into the corresponding sections of the gas space $2^b$ and then down through openings $a$ and $b$ into the space on the other side of the partition $5^a$.

The charged sections of the body 1 are regenerated by passing steam or the like through the inlets 7 upwardly into the corresponding gas spaces $2^b$, then through the charged adsorption material and the resulting mixture of gas passes out through the outlet 8.

The gas remaining after the charge with raw gas may be passed through suitable conduits 12, indicated in Fig. 2, through sections of the hot adsorption material after it has passed out of the regeneration zone, to cool it down and the gas cooled by condenser action may be passed through inlets 9 through other sections of the body of adsorption material to cool it still further down to condition the adsorption material for adsorption. Openings 10 and 11 indicate outlets from the respective sections.

The conduits and connections in the casing 5 may be arranged in various ways to suit particular conditions. The material feature is the single sliding contact surface between plates $4^a$, $4^b$ and $5^c$, $5^d$. Provisions can be readily made for preventing leaks of gas from this single contact surface.

The operation of the apparatus will be apparent from Fig. 2. Assuming the adsorbent carrier to be rotating in a clockwise direction, the paths of the various fluids are indicated by the arrows. Raw gas entering through inlet 6 passes through the adsorbent adjacent the inlet and is stripped of the material to be recovered. The stripped gas then flows through conduit 12, and passes through the hot regenerated adsorbent in the sectors above the outlet openings 10. As the carrier rotates the charged sectors pass from the adsorbing zone adjacent inlet 6 to the regenerating or recovery zone adjacent the outlet 8. At this zone, steam or the like enters through openings 7 and passes through the adsorbent to remove the adsorbed material. The resulting gas mixture passes out through the outlet 8 to suitable recovery apparatus. The sections are cooled by the stripped gas as they move over the outlets 10, and are subjected to further cooling as they pass through the zone adjacent the inlets 9. The adsorbent in each section goes through the cycle of adsorption, regeneration and cooling each time the carrier makes one revolution.

In the foregoing we have described what we consider as a preferred embodiment of the invention. The arrangement described is particularly advantageous inasmuch as the problem of supporting the revoluble part and the problem of providing a single sliding contact have found a common solution. It is understood, however, that the main problem of providing a single sliding contact surface may be solved in various other ways.

The arrangement of conduits for giving the gas stream the desired course through the different sections of the adsorption material is a matter of course in the light of the aforementioned application and does not form a part of the invention proper.

We claim:—

1. An adsorption apparatus, comprising a body of adsorptive material and means for alternately charging and regenerating different sections of the adsorption material, including conduits for passing gas into and out of different sections of the adsorption material, said conduits terminating in a single smooth surface, and gas distributing means terminating in a surface in contact with the said surface.

2. An adsorption apparatus, comprising a circular body of adsorption material and means for alternately charging and regenerating different sections of the adsorption material, including a casing surrounding the adsorption material and having a surface symmetrical throughout relatively to an axis of revolution, inlet and outlet conduits for passing gas into and out of different sections of the adsorption material, said conduits terminating in said surface, and gas distributing means terminating in a surface in contact with said surface.

3. An adsorption apparatus, comprising a circular body of adsorption material, a casing defining gas conduits to and away from different sections of the adsorption material, said conduits terminating in a surface symmetrical throughout to an axis of revolution, and gas distributing means terminating in a surface in contact with the said surface.

4. An adsorption apparatus, comprising an annular body of adsorption material, an annular casing defining gas spaces on opposite sides of the annular body, one surface of the casing being symmetrical throughout to the axis of the annular body of adsorptive material, partition walls within the casing for dividing the gas spaces into separate conduits for passing the gas into, through and out of different sections of the adsorptive material, said conduits terminating in said symmetrical surface, and gas distributing means terminating in a surface in contact with said surface.

5. An adsorption apparatus, comprising an annular body of adsorptive material, an annular casing defining gas spaces on opposite sides of the annular body and including a flat annular plate forming closures at one end of the annular body on opposite sides thereof, openings in said annular plate communicating with the gas spaces on the opposite sides of the annular body, respectively, radial partition walls dividing the gas spaces and the annular body into a plurality of sector-like parts, and gas distributing means terminating in a surface in contact with the said flat annular plate.

6. An adsorption apparatus, comprising an annular vertically disposed body of adsorption material, a casing defining annular gas spaces on opposite sides of the annular body and defining a flat annular closure at the bottom, radial partitions dividing the gas spaces and the annular body into a plurality of sector-like parts, openings in the said annular closure communicating with the different sections of the gas spaces to define gas inlets and outlets respectively, and means for supporting all the mentioned parts as a unit for rotation, including a plate in sliding contact with said annular plate, provided with openings adapted to register with the openings in the said annular plate, the supporting means defining gas passages for passing gas into and out of the different parts of the casing and the body of adsorptive material.

7. Apparatus according to claim 6 wherein the openings in the annular plates are sector shaped, the openings in the annular plate of the rotary casing being relatively narrow and the openings in the annular plate of the supporting means being relatively wide and interconnected by narrow webs.

In testimony whereof, we affix our signatures.

Dr. Ing. RICHARD TIEDTKE.
Prof. JACOB BENZ.